(12) United States Patent
Lin

(10) Patent No.: US 7,095,465 B2
(45) Date of Patent: Aug. 22, 2006

(54) THIN FILM TRANSISTOR LIQUID CRYSTAL DISPLAY AND METHOD FOR MANUFACTURING THE SAME

(75) Inventor: Wen-Jian Lin, Hsinchu (TW)

(73) Assignee: Prime View International Co., Ltd., Hsinchu (TW)

(*) Notice: Subject to any disclaimer, the term of this patent is extended or adjusted under 35 U.S.C. 154(b) by 419 days.

(21) Appl. No.: 10/139,852

(22) Filed: May 7, 2002

(65) Prior Publication Data
US 2003/0038899 A1 Feb. 27, 2003

(30) Foreign Application Priority Data
Aug. 24, 2001 (TW) .......................... 90120948 A

(51) Int. Cl.
G02F 1/1335 (2006.01)

(52) U.S. Cl. .......................... 349/113; 349/43
(58) Field of Classification Search .............. 349/113, 349/43, 139
See application file for complete search history.

(56) References Cited

U.S. PATENT DOCUMENTS 5,953,093 A * 9/1999 Hirata et al. ................ 349/143
6,195,140 B1 * 2/2001 Kubo et al. .................. 349/44
2002/0163608 A1 * 11/2002 Ting et al.

* cited by examiner

Primary Examiner—Tarifur R. Chowdhury
Assistant Examiner—Thoi V. Duong
(74) Attorney, Agent, or Firm—Volpe and Koenig, P.C.

(57) ABSTRACT

There is provided a reflection type/transflection type thin film transistor liquid crystal display, including an insulating substrate, a thin film transistor formed on the insulating substrate, a transparent electrode made of indium-tin-oxide formed on the thin film transistor and electrically contacted with a source region and a drain region of the thin film transistor, and a curved conducting structure with an inclination of 3 to 20 degrees formed on the transparent electrode.

6 Claims, 10 Drawing Sheets

THIN FILM TRANSISTOR LIQUID CRYSTAL DISPLAY AND METHOD FOR MANUFACTURING THE SAME

FIELD OF THE INVENTION

The present invention is related to a liquid crystal display (LCD), and more particularly, the present invention is related to reflection type/transflection type thin film transistor liquid crystal display and the manufacturing process thereof.

BACKGROUND OF THE INVENTION

With the increasing progress in the manufacturing technique of flat panel display, liquid crystal display (LCD) has been extensively employed as a main stream display device. The LCD uses electric field to control the alignment of the liquid crystal molecules in the liquid crystal layer, and determine whether the polarized light can pass through the liquid crystal layer to make a dark display or a white display. As a result, how to get a brighter display for LCD has become a significant target for the research on the manufacturing process of the liquid crystal display device.

For a reflection type or a transflection type thin film transistor liquid crystal display (TFTLCD), its brightness is determined by the incident light emitted from a light source and the reflecting light thereof. If it is desirable to obtain a brighter display, the intensity of light scattering in a direction perpendicular to the display screen has to be increased. For this purpose the reflective characteristic of the reflector thereof has to be intensified. As shown in FIG. 1(a), a resin coating 114 comprised of a plurality of transparent resin beads 113 having a penetrative characteristic is formed on a first transparent electrode layer 111, in order that when light passes through the first transparent electrode layer 111 and the color filter 112 and enters the resin coating 114, a deflection is made to the light departing from the resin coating 114 due to the collisions against the transparent resin beads 113. Further the light is scattered by way of the electric field applied between the second electrode layer 116 on the TFT array substrate 115 and the first transparent electrode layer 111, and the scattered light is then reflected by the reflector 117. The conventional reflection type/transflection type TFTLCD of FIG. 1(a) is advantageous in terms of the increase in the light scattering angle, and thus the direction of reflection is easy to be controlled. However, the reflection type/transflection type TFTLCD of FIG. 1(a) is disadvantageous by that the direction of light scattering is quite difficult to be controlled precisely by adjusting the locations of the transparent resin beads 113.

To solve the foregoing drawbacks experienced by the prior art, a novel manufacturing process for the reflection type/transflection type TFTLCD that forms the resin coating directly on the second electrode layer on the TFT array substrate has been addressed. As shown in FIG. 1(b), when light passes through the color filter 122, light scattering effect will come about due to the electric field applied between the second electrode layer 126 and the first electrode layer 121. The scattered light will then be reflected by the resin coating 124. Because the resin coating 124 is a curved structure, its uneven surface can be used to regulate the magnitude of the angle of reflection, and thereby the direction of reflection can be effectively controlled.

Though the prior art uses a resin coating to increase the intensity of light scattering in a direction perpendicular to the display screen, the manufacturing cost of the reflection type/transflection type TFTLCD is quite expensive and the manufacturing process is quite complex (with one more photomask required). Indeed, how to reduce the manufacturing cost and simplify the manufacturing process of the conventional reflection type/transflection type TFTLCD is a major object of advancing the development of the manufacturing technique of the existing display device. The present invention can satisfy these needs.

SUMMARY OF THE INVENTION

An object of the present invention is to provide a manufacturing process for a thin film transistor liquid crystal display, comprising the steps of: (a) providing an insulating substrate, (b) forming a thin film transistor the insulating substrate and forming a transparent electrode on the thin film transistor, wherein the transparent electrode is electrically contacted with a source region and a drain region of the thin film transistor, (c) forming a conducting layer on the transparent electrode layer, and (d) etching the conducting layer to define a curved structure with an inclination on the transparent electrode.

Preferably, the angle of the inclination may be ranged from 3 to 20 degrees, and the curved structure may be shaped into an awl-shaped structure or a conical structure.

Another object of the present invention is focused on the provision of a manufacturing process for a thin film transistor liquid crystal display, comprising the steps of: (a) providing an insulating substrate, (b) forming a gate structure on a portion of the insulating substrate, (c) forming an insulating layer on the insulating substrate and the gate structure, (d) forming a first semiconductor structure and a second semiconductor structure on the insulating layer, (e) forming a conducting layer on the insulating layer and the second semiconductor structure, (f) etching the conducting layer to define a source region and a drain region and a curved structure with an inclination on the insulating layer, and (e) forming a transparent electrode on the curved structure, wherein the transparent electrode is electrically contacted with a source region and a drain region of the conducting layer.

A further object of the present invention is involved with a thin film transistor liquid crystal display, including an insulating substrate, a thin film transistor formed on the insulating substrate, a transparent electrode formed on the insulating substrate and the thin film transistor and electrically contacted with a source region and a drain region of the thin film transistor, and a curved structure with an inclination formed on the transparent electrode.

It is still an object of the present invention to provide a thin film transistor liquid crystal display, including an insulating substrate, a thin film transistor formed on the insulating substrate, a curved structure with an inclination formed on the insulating substrate, and a transparent electrode formed on the curved structure.

Now the foregoing and other features and advantages of the present invention will become more apparent through the following embodiments with reference to the accompanying drawings, wherein:

DETAILED DESCRIPTION OF THE PREFERRED EMBODIMENT

Figure 1A:
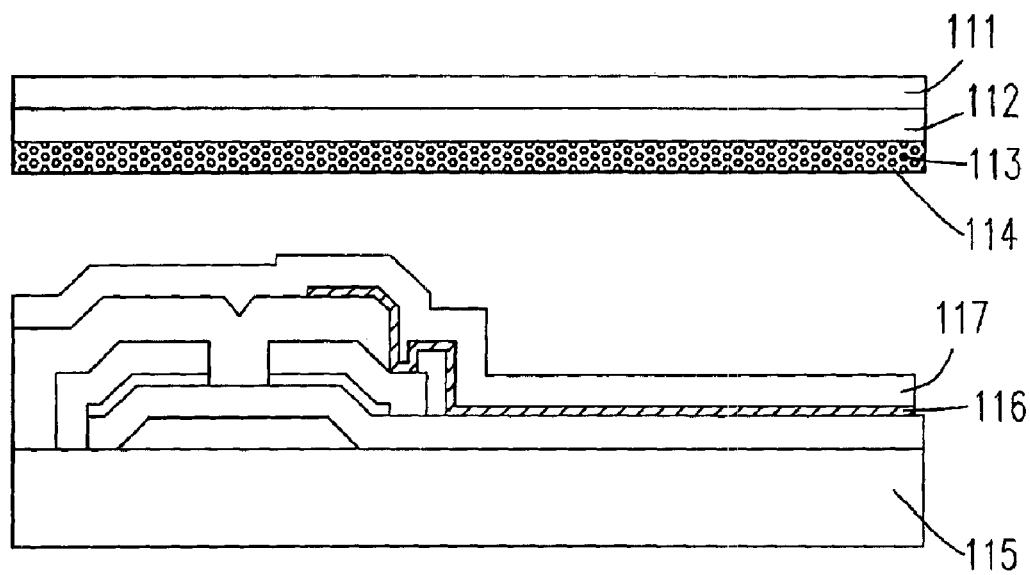
FIGS. 1 (a) and 1(b) are cross-sectional views schematically illustrating the reflection type/transflection type TFTLCD according to the prior art.
Figure 1B:
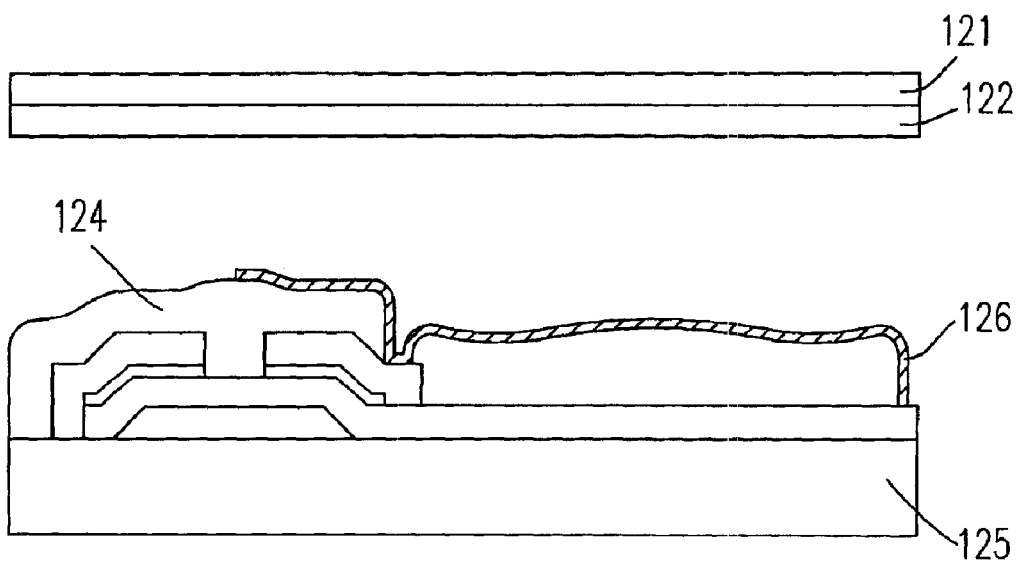
Figure 2A:
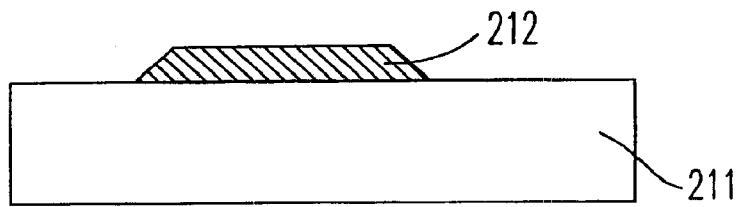
FIGS. 2(a) to 2(h2) are cross-sectional views schematically illustrating the manufacturing steps involved in the production of TFTLCD according to a first preferred embodiment of the present invention.
Figure 2B:
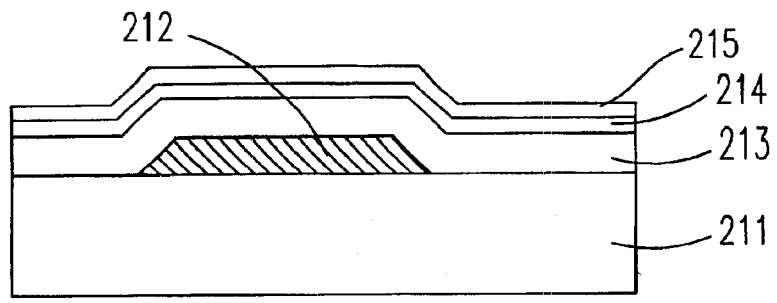
Figure 2C:
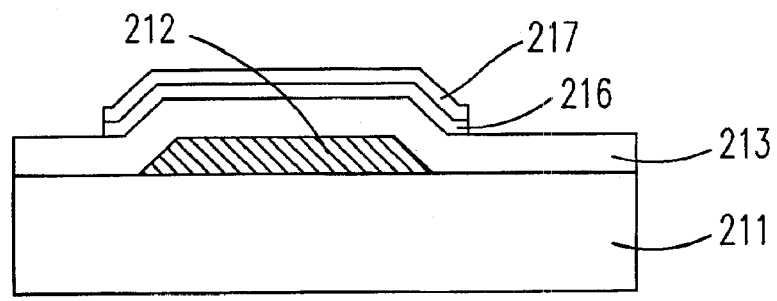
Figure 2D:
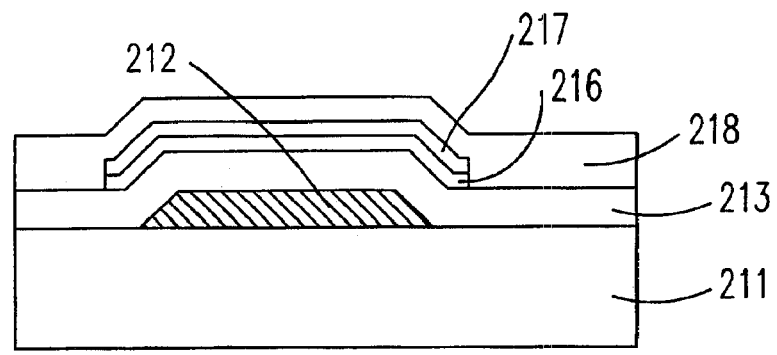
Figure 2E:
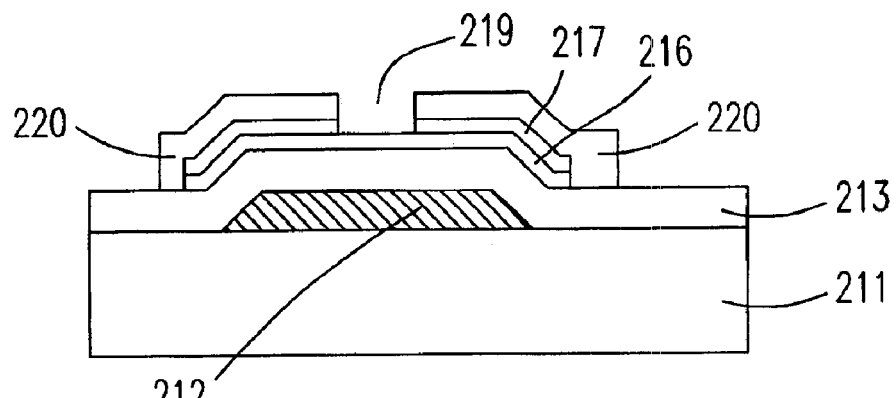
Figure 2F:
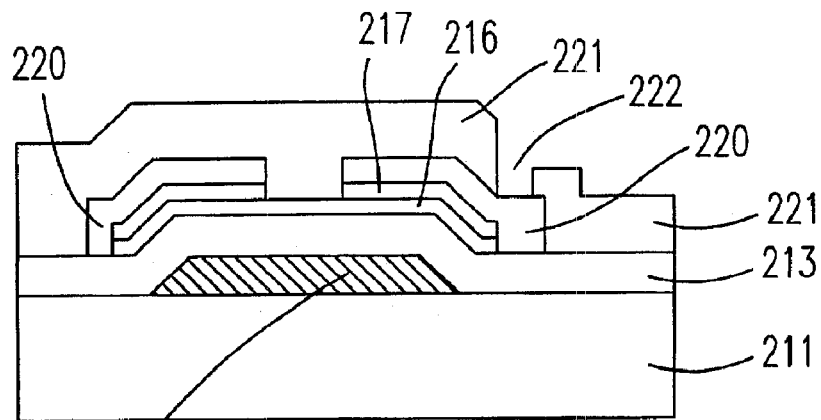
Figure 2G:
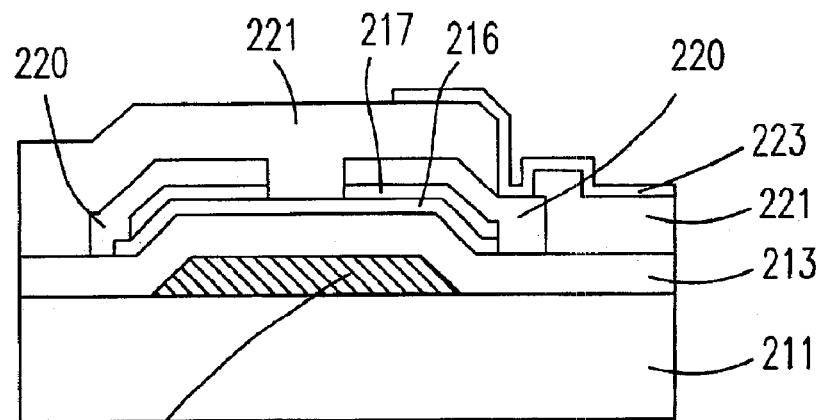
Figure 2:
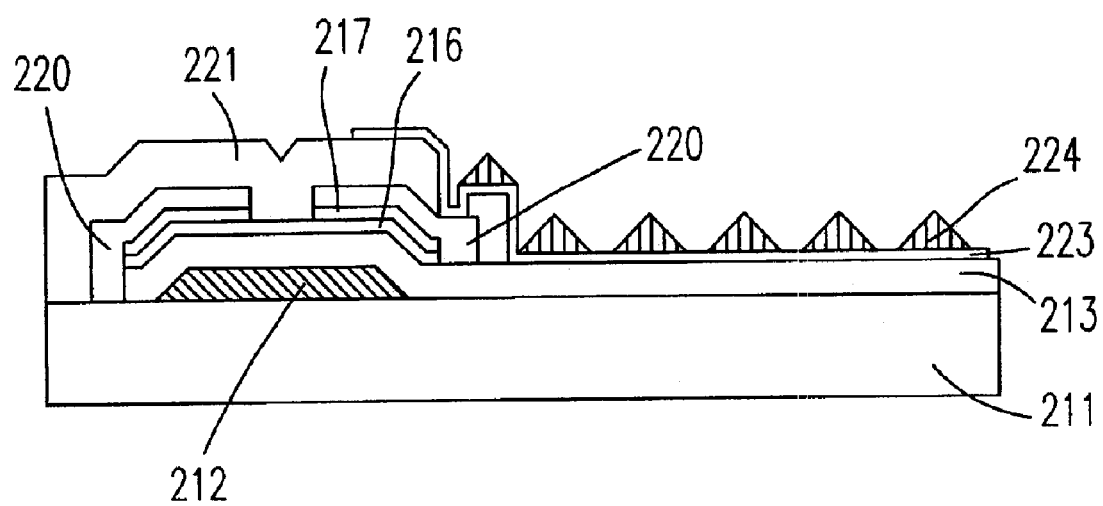
Figure 2:
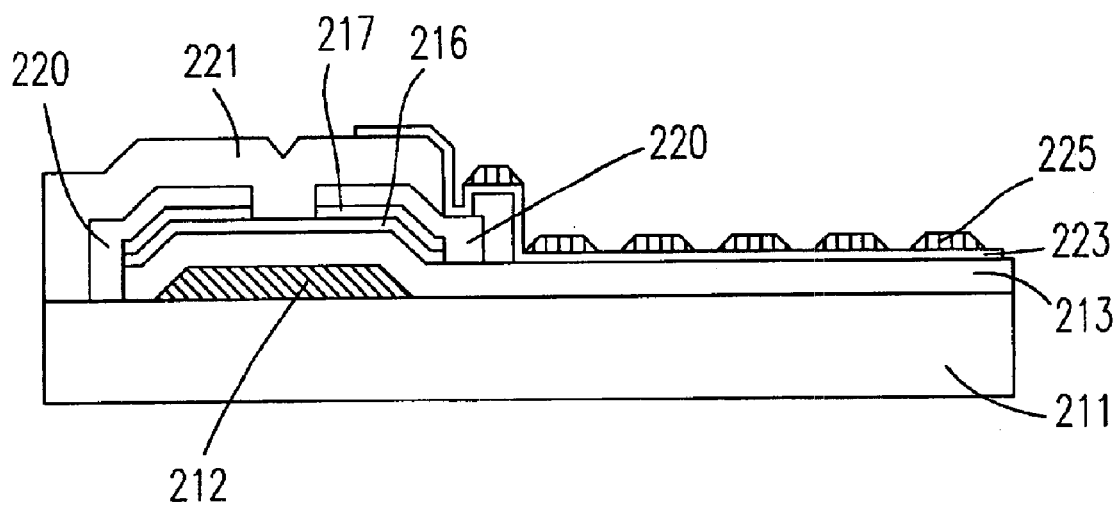

The manufacturing steps involved in the production of the TFTLCD according to a first preferred embodiment of the present invention can be best understood in virtue of the following descriptions and the cross-sectional views of FIGS. 2(a) to 2(h2). Referring to FIG. 2(a), an insulating substrate 211 is provided and a conducting layer (which can be formed from chromium, tungsten molybdenum, tantalum, aluminum or copper) is formed onto the insulating substrate 211, and a first photomask lithography and etching process is performed define a gate structure 212 on the insulating substrate 211. In FIG. 2(b), an insulating layer 213, a first semiconductor layer 214 (which is commonly made of an amorphous-silicon layer) and a second semiconductor layer 215 (which is commonly made of a highly-doped N+ amorphous-silicon layer) are sequentially formed on the gate structure 212 and the substrate 211. As shown in FIG. 2(c), a second photomask lithography and etching process is performed to remove a portion of the first semiconductor layer 214 and the second semiconductor layer 215, so as to define a first semiconductor structure 216 and a second semiconductor structure 217 on a portion of the insulating layer 213. As shown in FIG. 2(d), a conducting layer 218 is deposited onto the second semiconductor structure 217 and the insulating layer 213. As shown in FIG. 2(e), a third photomask lithography and etching process is performed to remove a portion of the conducting layer 218 and the second semiconductor structure 217. An opening 219 exposing a portion of the surface of the first semiconductor structure 216 is formed in the conducting layer 218, and a source region and a drain region 220 are respectively defined on the opposite sides of the opening 219. In FIG. 2(f), a passivation film 221 (which is commonly made of silicon nitride) is formed to cover the drain and source region 220, and a fourth photomask lithography and etching process is performed to define a contact window 222. Referring to FIG. 2(g), a transparent electrode layer commonly made of indium-tin-oxide (ITO) is formed on the passivation film 221, and a fifth photomask lithography and etching process is performed to define a transparent pixel electrode 233. FIGS. 2(h1) and 2(h2) respectively show that a conducting layer is formed onto the transparent pixel electrode 233, and a sixth photomask lithography and etching process is performed to define awl-shaped conducting structures 224 and conical conducting structures 225 on the transparent pixel electrode 223. With the variation of the parameters of the concentration of the etch agent, etching time, temperature and so on, awl-shaped conducting structures 224 or conical conducting structures 225 that are of different awl-like profiles may be formed on the transparent pixel electrode 223. More preferably, both of the awl-like conducting structures 224 and 225 have an inclination of 3 to 20 degrees, and thereby the light scattering angle can be adjusted appropriately.

Figure 3A:
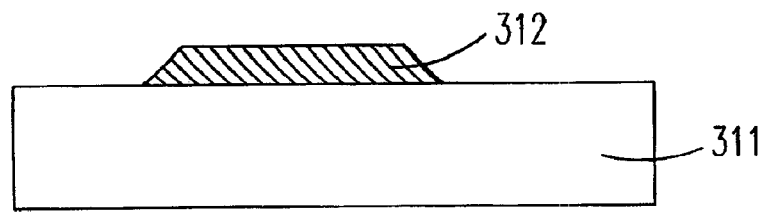
FIGS. 3(a) to 3(g4) are cross-sectional views schematically illustrating the manufacturing steps involved in the production of TFTLCD according to a second preferred embodiment of the present invention.
Figure 3B:
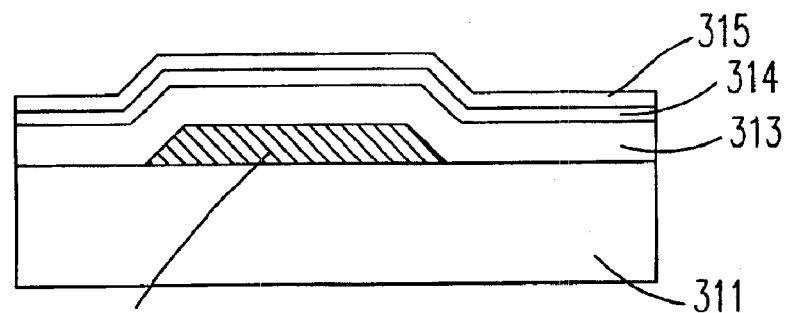
Figure 3C:
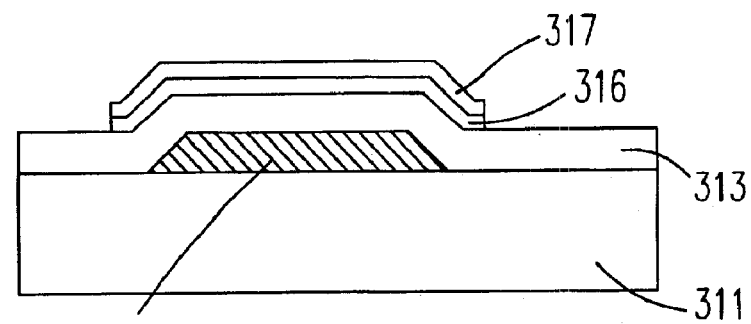
Figure 3D:
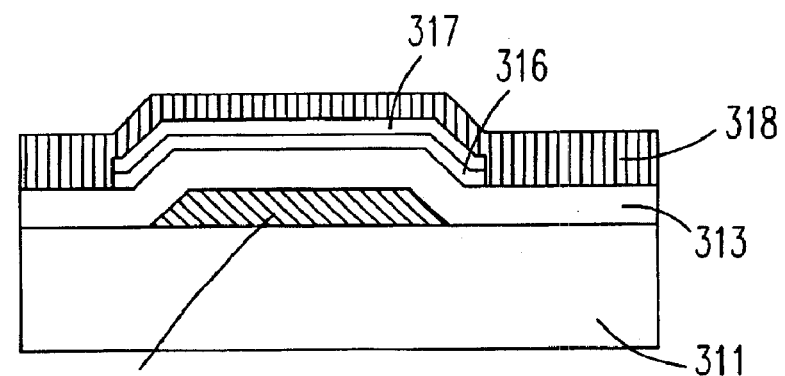
Figure 3:
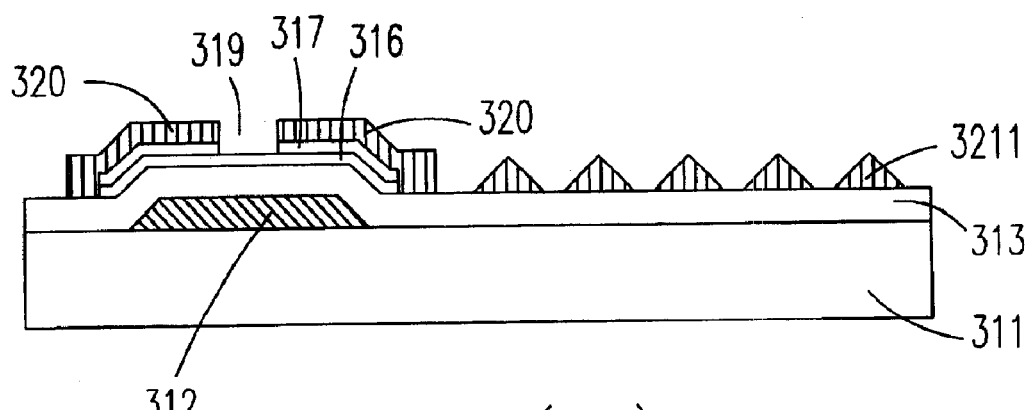
Figure 3:
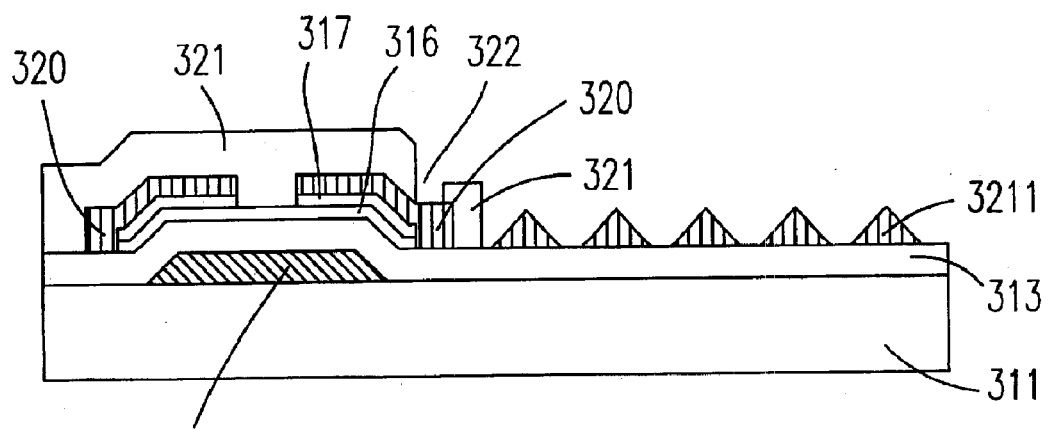
Figure 3:
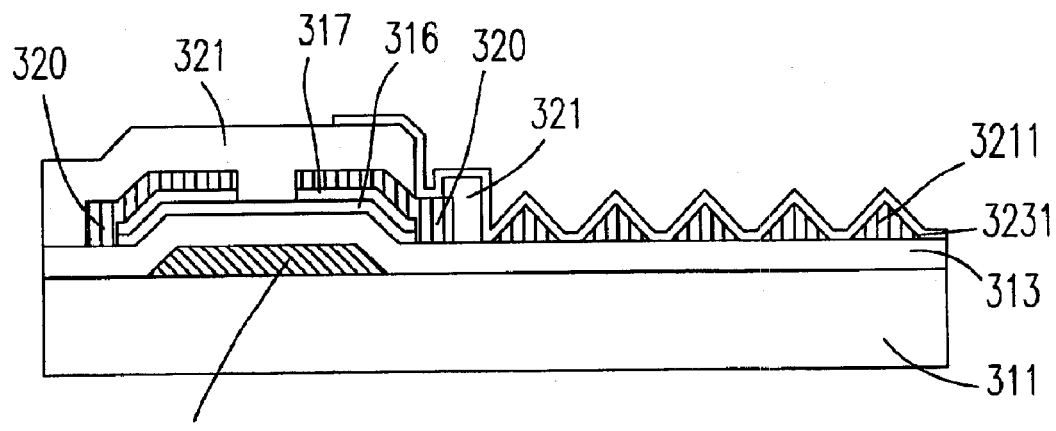
Figure 3:
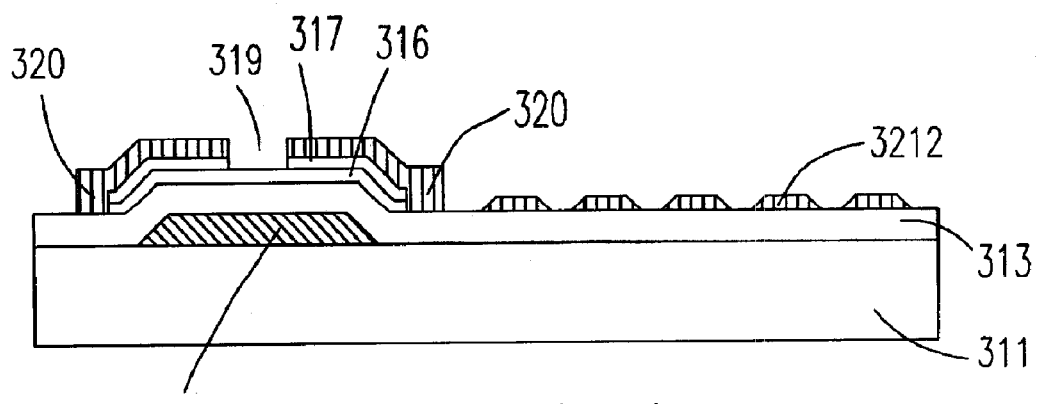
Figure 3:
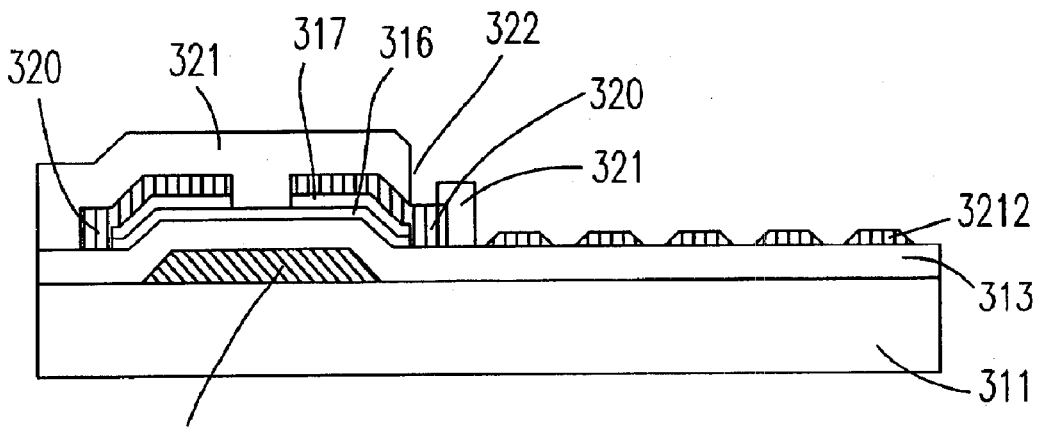
Figure 3:
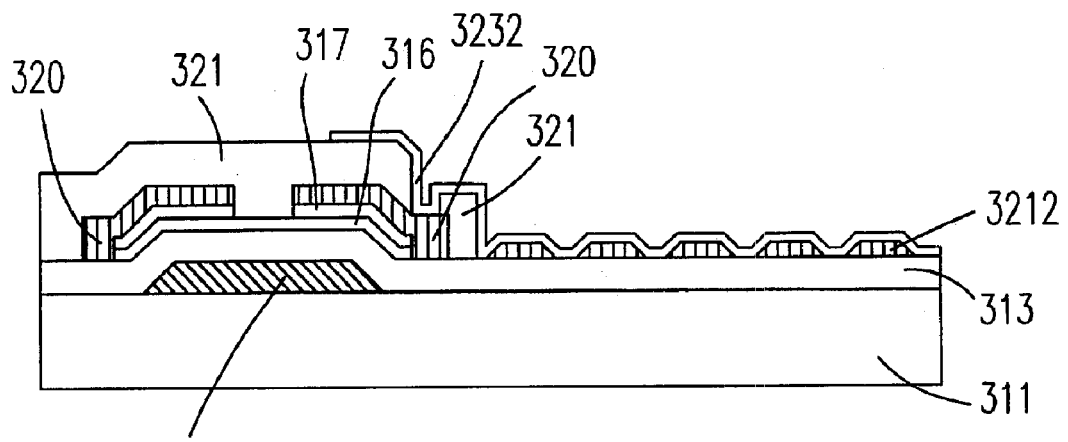
Figure 3:
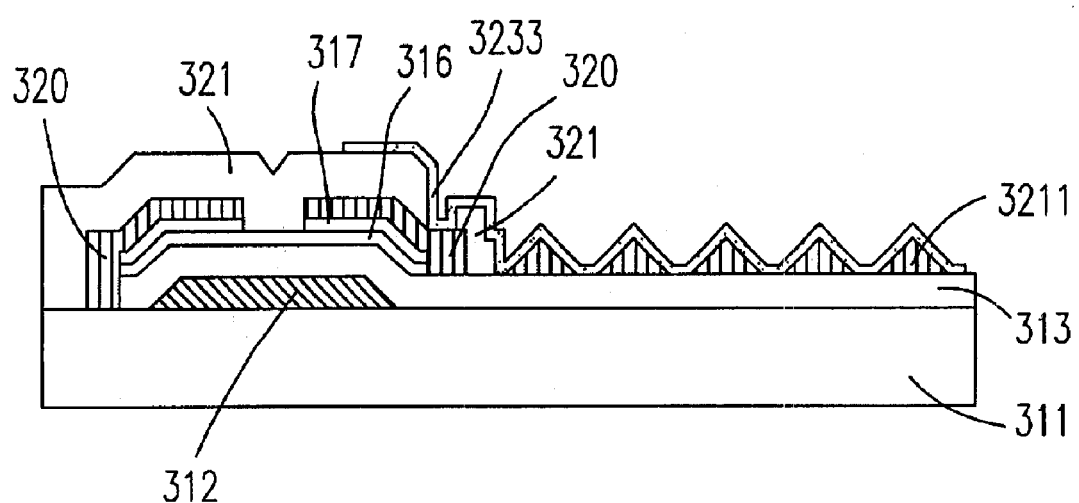
Figure 3:
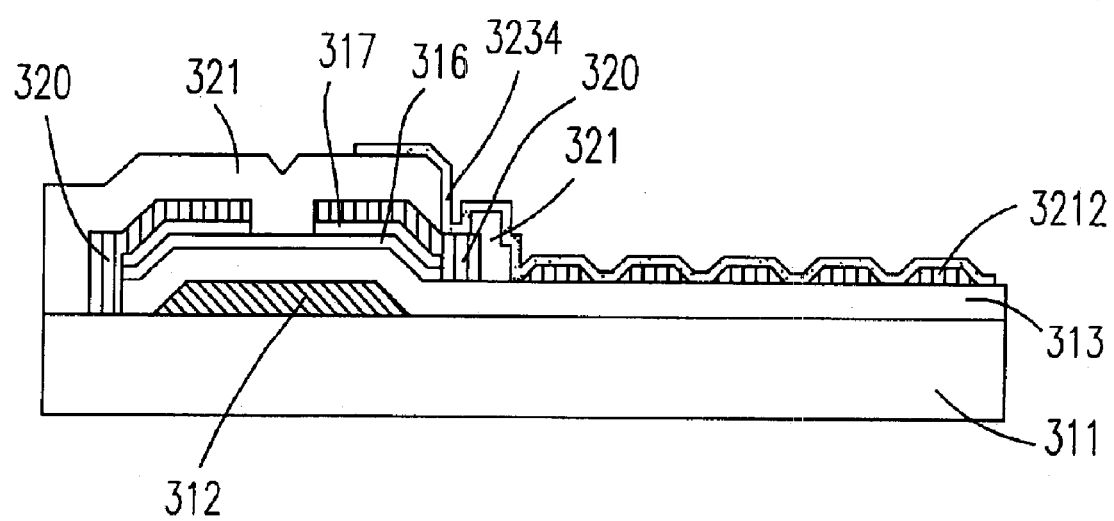

The formation steps of the TFTLCD according to a second preferred embodiment of the present invention can be best understood in virtue of the following descriptions and the cross-sectional views of FIGS. 3(a) to 3(g4). Referring to FIG. 3(a), an insulating substrate 311 is provided and a conducting layer (which can be formed from chromium, tungsten molybdenum, tantalum, aluminum or copper) is formed on the insulating substrate 311, and a first photomask lithography and etching process is then performed to define a gate structure 312 on the insulating substrate 311. Next, as shown in FIG. 3(b), an insulating layer 313, a first semiconductor layer 314 (which is commonly made of an amorphous-silicon layer) and a second semiconductor layer 315 (which is commonly made of a highly-doped N+ amorphous-silicon layer) are sequentially formed on the gate structure 312 and the substrate 311. As shown in FIG. 3(c), a second photomask lithography and etching process is performed to remove a portion of the first semiconductor layer 314 and the second semiconductor layer 315, so as to define a first semiconductor structure 316 and a second semiconductor structure 317 on a portion of the insulating layer 313. As shown in FIG. 3(d), a conducting layer 318 is deposited onto the second semiconductor structure 317 and the insulating layer 313. As shown in FIGS. 3(e1) and 3(e2), a third photomask lithography and etching process is performed to remove a portion of the conducting layer 318 and the second semiconductor structure 317. An opening 319 exposing a portion of the surface of the first semiconductor structure 316 is formed in the conducting layer 318, and a source region and a drain region 320 are respectively defined on the opposite sides of the opening 319. In FIG. 3(e1), a fourth photomask lithography and etching process is performed to define awl-shaped conducting structures 3211 on the insulating layer 313. In FIG. 3(e2), a fourth photomask lithography and etching process is performed to define conical conducting structures 3212 on the insulating layer 313. With the variation of the parameters of the concentration of the etch agent, etching time, temperature and so on, awl-shaped conducting structures 3211 or conical conducting structures 3212 that are of different awl-like profiles may be formed on the insulating layer 313. More preferably, both of the awl-like conducting structures 224 and 225 have an inclination of 3 to 20 degrees, and thereby the light scattering angle can be adjusted appropriately. FIGS. 3(f1) and 3(f2) respectively shows that after the source and drain region 320 are defined, a passivation film 321 (which is commonly made of silicon nitride) is formed to cover the drain and source region 320, and a fifth photomask lithography and etching process is performed to define a contact window 322. FIGS. 3(g1) and 3(g2) respectively shows that after a transparent electrode layer commonly made of indium-tin-oxide (ITO) is deposited onto the passivation film 321 and the awl-like conducting structures 3211 and 3212, a sixth photomask lithography and etching process is performed to define a transparent pixel electrode 3231 and 3232.

The formation of the awl-like conducting structures as mentioned above can be further illustrated by the following manufacturing steps to get a better understanding to the present invention.

First, a double-layer metal film is deposited, for example, a molybdenum-chromium alloy thin-film of a thickness of 200 nm is deposited as the bottom layer, and an aluminum alloy thin-film of a thickness of 50 nm is deposited on the molybdenum-chromium alloy thin-film as a top layer. With the use of photomask to perform exposure and development steps to define the pattern of the area that is to be reserved, an etching step is then performed with a mixed-acid based etch solution, for example, the mixture of phosphoric acid ($H_3PO_4$), nitric acid ($HNO_3$) and/or acetic acid ($CH_3COOH$) to etch the double-layer metal film, so as to define awl-like conducting structures with an inclination. The angle of the inclination may be controlled by adjusting the over-etching time in cooperation with the photomask of an appropriate line width (about 3 μm to 10 μm), and further awl-shaped or conical conducting structures can be created as desired.

A preferable aspect of the present invention is to provide a reflection type/transflection type TFTLCD. Therefore, the transparent electrode layer made of ITO can be served for a third conducting layer. FIGS. 3(g3) and 3(g4) respectively show that after the third conducting layer is deposited onto the passivation film 321 and the awl-like conducting structures (3211,3212), a sixth photomask lithography and etching process is performed to define a pixel area constituted by transparent electrode (3233,3234).

In conclusion with the above statements, it can be readily understood that the present invention is superior to the prior art in terms of the inclusion of the awl-like conducting structures with an inclination. Because the awl-like conducting structures is provided with an inclination, the magnitude of the light reflecting angle can be adjusted and the direction of reflection can be controlled efficiently. More specifically, with the introduction of the present invention, the manufacturing process of the thin film transistor liquid crystal display can be simplified by eliminating one photomask lithography and etching process compared with the prior art, and the manufacturing cost can be slashed due to the removal of the costly resin coating.

Those of skill in the art will soon recognize that these and other modifications can be made within the spirit and scope of the present invention as further defined in the appended claims.

What is claim is:

1. A method of manufacturing a thin film transistor liquid crystal display comprising the steps of:

(a) providing an insulating substrate;

(b) forming a thin film transistor on said insulating substrate and forming a transparent electrode on said thin film transistor, wherein said transparent electrode is electrically contacted with a source region and a drain region of said thin film transistor;

(c) forming a conducting layer on said transparent electrode; and (d) etching said conducting layer to define a curved structure with an inclination on said transparent electrode.

2. The method of claim 1 wherein an angle of said inclination is about 3 to 20 degrees.

3. The method of claim 1 wherein said curved structure is formed from a metallic material.

4. The method of claim 1 wherein said curved structure is an awl-shaped structure.

5. The method of claim 1 wherein said curved structure is a conical structure.

6. The method of claim 1 wherein said transparent electrode is formed from indium-tin-oxide.

* * * * *